UNITED STATES PATENT OFFICE.

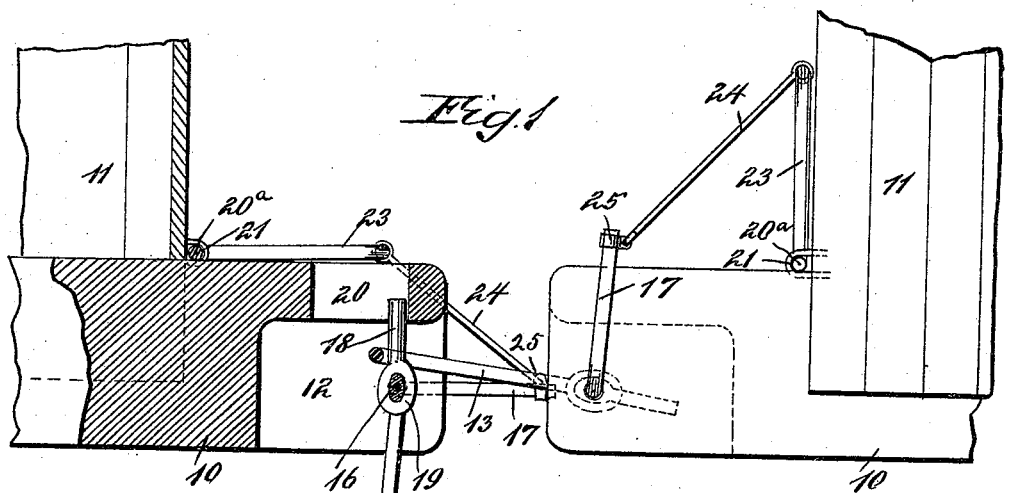

WILLIAM W. SMITH, OF TRAVERSE CITY, MICHIGAN.

CAR-COUPLING.

SPECIFICATION forming part of Letters Patent No. 494,391, dated March 28, 1893.

Application filed September 30, 1892. Serial No. 447,373. (No model.)

*To all whom it may concern:*

Be it known that I, WILLIAM W. SMITH, of Traverse City, in the county of Grand Traverse and State of Michigan, have invented a new and Improved Car-Coupling, of which the following is a full, clear, and exact description.

My invention relates to improvements in car couplings such as are adapted to automatically couple cars together; and the object of my invention is to produce a car coupling of the greatest simplicity, which is positive in its operation, which locks the cars together so that they cannot be accidentally detached, which is constructed so that it will not clog with snow and ice, and which may be safely and conveniently uncoupled from the top or sides of the car.

To this end my invention consists in certain features of construction and combinations of the same, which will be hereinafter described and claimed.

Reference is to be had to the accompanying drawings forming a part of this specification, in which similar figures of reference indicate corresponding parts in all the views.

Figure 1 is a broken side elevation, partly in vertical section, of two connected couplings, showing them applied to cars. Fig. 2 is an end view of one of the couplings, showing it engaged with the link of an opposing coupling and with the said link in section; and Fig. 3 is an end view of a modified form of coupling.

The coupling is provided with a drawbar 10 which is secured to the under side of the car 11 in substantially the usual way; and the drawbar has at its front end a mouth or recess 12 which is cut away on the under side so as to permit the free swinging of the coupling link 13, which link drops downward in a nearly vertical position when not in use, as shown in Figs. 1 and 2, and the link is of an elongated U-shape and has its arms formed into terminal eyes 14 which are secured to a sleeve 15 held transversely in the mouth of the drawbar, and the sleeve is rigidly attached to a crank shaft 16 which is journaled transversely in the drawbar and projects through one wall thereof, the crank shaft having at one end a crank 17 which extends at right angles to the shaft, as shown clearly in Fig. 1.

The link 13 may be attached directly to the shaft 16, but it is better to have a sleeve 15 interposed between the eyes 14 and the shaft, as it increases the strength and durability of the coupling. The coupling is provided with a locking pin 18, the lower end of which is formed into an eye 19 and the latter is fastened upon the sleeve 15 between the eyes 14, and it extends in a direction nearly opposite to the link 13. The free end of the pin 18 is held to swing in a slot 20 in the top of the drawbar, and when the pin is in its highest position, it rests against the front wall of the slot 20 so that the link which is in engagement with the pin cannot be displaced. A second crank shaft 20ª is journaled on the front end of the car, above the drawbar, being held to turn in staples 21 or other suitable supports, and the ends of this crank shaft are formed into cranks 22 which swing at the sides of the car, as shown in Fig. 2. This shaft 20ª has a forwardly extending arm 23 which is arranged at one side of the drawbar, and the free end of the arm is pivotally connected to a rod 24, the front end of which is pivoted to a clip 25 on the crank 17. The arm 23 and crank 17 are arranged so that when the arm 23 is in a vertical position, as shown in Fig. 1, the crank 17 will also be in a nearly vertical position, and the link 13 will extend forward from the mouth of the drawbar. It will be seen that by turning the shaft 20ª the crank 17 and link 13 may be operated so as to bring the link into any desired position, and it will also be noticed that the pin 18 moves in unison with the link so that when the link extends forward, the pin extends backward.

The operation of the coupling is as follows:— The links 13 will hang normally downward, as shown at the left hand in Fig. 1. When the cars are to be coupled and as they approach, one of the shafts 20ª is turned so as to lift the crank 17 and link 13; the link will then extend forward and will enter the mouth of the opposing drawbar so as to strike the pin 18, the pin will swing back and the link 13 will push in over the pin, and after the link passes the pin, the pin will swing back into position so as to prevent the withdrawal of the link.

It will be understood that a chain may be attached to the crank 17 and extended upward to the car top, or a chain may be connected with the crank shaft 20ª in any of the usual ways and extended to the car top, so that the coupling may be worked from the top as well as from the sides of the car.

In case an exceptionally strong drawbar is desirable the form shown in Fig. 3 may be used. Here the coupling is constructed in substantially the manner already described, except that the drawbar has a separate recess 12ª above the mouth 12, the recess 12ª being adapted to receive the link of an opposing coupling, and this construction causes the strain to be taken from the shaft 16.

It will be noticed that the only top opening in the drawbar is the small slot 20, so that snow and ice cannot accumulate in the drawbar and prevent the working of the link and pin. It will also be noticed that the link 13 may when necessary be attached to an old fashioned link and pin coupler.

Having thus described my invention, I claim as new and desire to secure by Letters Patent—

In a car coupler, the combination with the draw bar 10, having a mouth 12 in its lower front end, and a narrow opening 20 in its top communicating with the mouth 12, the crank shaft 16, the sleeve 15 fixedly held on the said shaft, the link 13 secured at its ends to the sleeve 15 and the pin 18 projected from such sleeve in an opposite direction, its free end adapted to swing in the opening 20, of a crank shaft 20ª journaled on the car body, having an arm 23, the clip 25 secured to crank arm of the shaft 16, and the rod 24 pivotally connected at its opposite ends to the crank arm 23, and the clip 25, as and for the purposes described.

WILLIAM W. SMITH.

Witnesses:
HOWARD IRISH,
J. T. HANNAH.